(12) United States Patent
Mishin Shuvi

(10) Patent No.: US 12,175,575 B2
(45) Date of Patent: *Dec. 24, 2024

(54) AUGMENTED REALITY EXPERIENCE BASED ON PHYSICAL ITEMS

(71) Applicant: Snap Inc., Santa Monica, CA (US)

(72) Inventor: Ma'ayan Mishin Shuvi, Givatayim (IL)

(73) Assignee: Snap Inc., Santa Monica, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/071,937

(22) Filed: Nov. 30, 2022

(65) Prior Publication Data

US 2023/0086704 A1  Mar. 23, 2023

Related U.S. Application Data

(63) Continuation of application No. 17/249,961, filed on Mar. 19, 2021, now Pat. No. 11,544,885.

(51) Int. Cl.
*G06T 11/60* (2006.01)
*G06F 18/22* (2023.01)
(Continued)

(52) U.S. Cl.
CPC .............. *G06T 11/60* (2013.01); *G06F 18/22* (2023.01); *G06K 7/1413* (2013.01);
(Continued)

(58) Field of Classification Search
CPC ....... G06T 11/60; G06T 11/001; G06T 13/40; G06T 13/80; G06V 20/00; G06V 2201/09;
(Continued)

(56) References Cited

U.S. PATENT DOCUMENTS 5,880,731 A   3/1999  Liles et al.
6,023,270 A   2/2000  Brush, II et al.
(Continued)

FOREIGN PATENT DOCUMENTS

CN   109863532 A   6/2019
CN   110168478 A   8/2019
(Continued)

OTHER PUBLICATIONS

"U.S. Appl. No. 17/249,961, Non Final Office Action mailed Mar. 25, 2022", 13 pgs.
(Continued)

*Primary Examiner* — Michelle Chin
(74) *Attorney, Agent, or Firm* — Schwegman Lundberg & Woessner, P.A.

(57) ABSTRACT

Methods and systems are disclosed for performing operations comprising: detecting, by a messaging application, purchase or possession of a physical item by a user; identifying an augmented reality experience related to the physical item; in response to detecting purchase or possession of the physical item, granting the messaging application to the augmented reality experience; capturing, by a camera of a client device associated with the user, an image that depicts the physical item; and applying one or more augmented reality elements associated with the augmented reality experience to the image of the physical item.

20 Claims, 14 Drawing Sheets

(51) Int. Cl.
  *G06K 7/14*       (2006.01)
  *G06Q 30/02*      (2023.01)
  *G06Q 30/0201*    (2023.01)
  *G06T 11/00*      (2006.01)
  *G06T 13/40*      (2011.01)
  *G06T 13/80*      (2011.01)
  *G06V 20/00*      (2022.01)
  *G11B 27/036*     (2006.01)
  *H04L 51/046*     (2022.01)

(52) U.S. Cl.
  CPC ........ *G06Q 30/0201* (2013.01); *G06T 11/001* (2013.01); *G06T 13/40* (2013.01); *G06T 13/80* (2013.01); *G06V 20/00* (2022.01); *G11B 27/036* (2013.01); *H04L 51/046* (2013.01); *G06V 2201/09* (2022.01)

(58) Field of Classification Search
  CPC .. G06F 18/22; G06K 7/1413; G06Q 30/0201; G11B 27/036; H04L 51/046
  See application file for complete search history.

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,648,865 B2 | 12/2014 | Dawson et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 11,151,794 B1 | 10/2021 | Chepizhenko et al. |
| 11,544,885 B2 | 1/2023 | Shuvi |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |

(56) References Cited

U.S. PATENT DOCUMENTS

| | | |
|---|---|---|
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0039613 A1* | 2/2017 | Kaehler ............ G06Q 30/0643 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0349703 A1 | 12/2018 | Rathod |
| 2019/0001223 A1 | 1/2019 | Blackstock et al. |
| 2019/0057616 A1 | 2/2019 | Cohen et al. |
| 2019/0179405 A1 | 6/2019 | Sun et al. |
| 2019/0188920 A1 | 6/2019 | Mcphee et al. |
| 2019/0281030 A1* | 9/2019 | Isaacson ............ H04L 63/0838 |
| 2020/0334885 A1 | 10/2020 | Jahangiri et al. |
| 2021/0097712 A1 | 4/2021 | Samudrala et al. |
| 2021/0303855 A1 | 9/2021 | Anvaripour et al. |
| 2022/0301245 A1 | 9/2022 | Shuvi |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 17/249,961, Notice of Allowance mailed Aug. 31, 2022", 8 pgs.

"U.S. Appl. No. 17/249,961, Response filed Jun. 23, 2022 to Non Final Office Action mailed Mar. 25, 2022", 10 pgs.

* cited by examiner

AUGMENTED REALITY EXPERIENCE BASED ON PHYSICAL ITEMS

PRIORITY CLAIM

This application is a continuation of and claims the benefit of priority of U.S. patent application Ser. No. 17/249,961, filed Mar. 19, 2021, which is hereby incorporated by reference in its entirety.

TECHNICAL FIELD

The present disclosure relates generally to providing augmented reality experiences using a messaging application.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
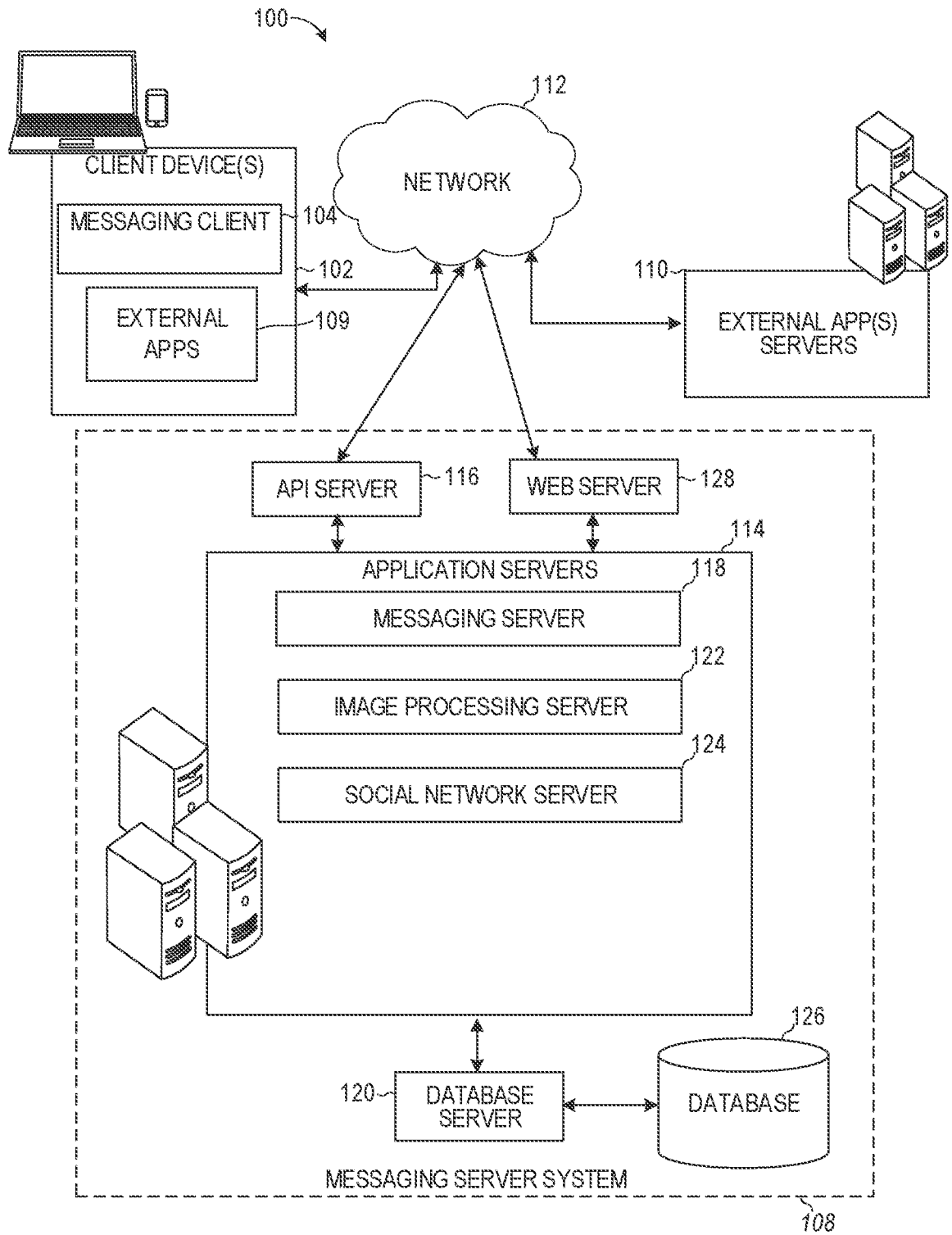
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, virtual reality (VR) and augmented reality (AR) systems allow users to try on virtually various physical products, such as glasses and clothing. The main goal of such systems is to encourage users to purchase such products by giving the user confidence in the purchase and to imitate the physical experience of trying on products. Namely, by allowing the user to see in AR or VR how a particular product looks on the user or looks in the user's environment, the user can better decide whether to purchase the product or not. While such systems generally work well, there is a growing need to further incentivize users to purchase products they find online and to incentivize other users to purchase what they already bought. Also, the typical systems lack any feedback loop that considers how the physical product looks on the user after the user purchases the product. This reduces the user's interest in further engaging with these systems to purchase goods in the future and reduces the motivation of the user to share online the user's new goods.

The disclosed techniques improve the efficiency of using an electronic device which implements or otherwise accesses an AR/VR system by allowing users to preview virtually how physical products (e.g., tangible items) look on the user before the user purchases the products and also incentivize the users to complete the purchases by providing unique AR experiences. Namely, the disclosed techniques unlock and enable access (e.g., grant access to on a limited basis) to unique augmented reality experiences associated with a physical item, such as a product, upon detecting that the user has completed a purchase of the physical item. For example, when the user purchases a physical product, the messaging application provides the user with access to an augmented reality experience that displays one or more augmented reality elements on an image or video captured by the user that depicts the physical product. In one example, the augmented reality experience allows the user to change the visual attributes (e.g., a color) of the physical item using a camera to capture the image or video of the physical item. Once the visual attributes are changed in the augmented reality experience, the disclosed embodiments identify a different physical product that matches the changed visual attributes. The different physical product can then be recommended to the user to purchase as another physical item.

By accessing the augmented reality experience, the user can share or show-off the purchase of the physical product with other users in a unique way. This can further spread awareness and increase popularity in the physical product among other users in the community, and can create a shopping experience in which the user virtually tries on a product, purchases the product and enjoys a unique AR experience associated with the physical product. The look and feel of the AR experience can be controlled and created by the manufacturer of the physical item in a way that promotes the brand.

In some cases, the AR experience associated with the physical product can only be accessed by users who purchase or own (or otherwise possess) the physical product. For example, the physical product can be associated with a barcode that can be scanned to access the AR experience associated with the physical product. In an example, a video or the AR experience can only be accessed and launched one time, an unlimited number of times, or a specified maximum number of times (e.g., 3 times) by the same user or client device associated with the user. Each time the AR experience is accessed or launched by the user, a counter is incremented and compared with the specified maximum number of times. If the count of the counter reaches the specified maximum number of times, the AR experience becomes disabled and is no longer accessible to the user. In another example, the AR experience becomes associated with a user identifier of the user who purchases or owns (possesses) the physical product. In this way, only a client device or messaging application that is associated with the same user identifier can be used to access and launch the AR experience associated with the product. This creates a limited access or restricted access AR experience that only users who purchase, own or possess certain physical products can access or launch. In some cases, the AR experience and conditions for accessing the AR experience can depend on the product that is purchased or possessed. In this way, the disclosed system provides a recommendation system that considers both the physical and virtual worlds in providing unique experiences.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more augmented reality experiences on a client device 102 when an image is captured by the client device 102. Specifically, the messaging client 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., adding augmented reality eyewear, lipstick or a hat to a face depicted in an image).

Figure 3:
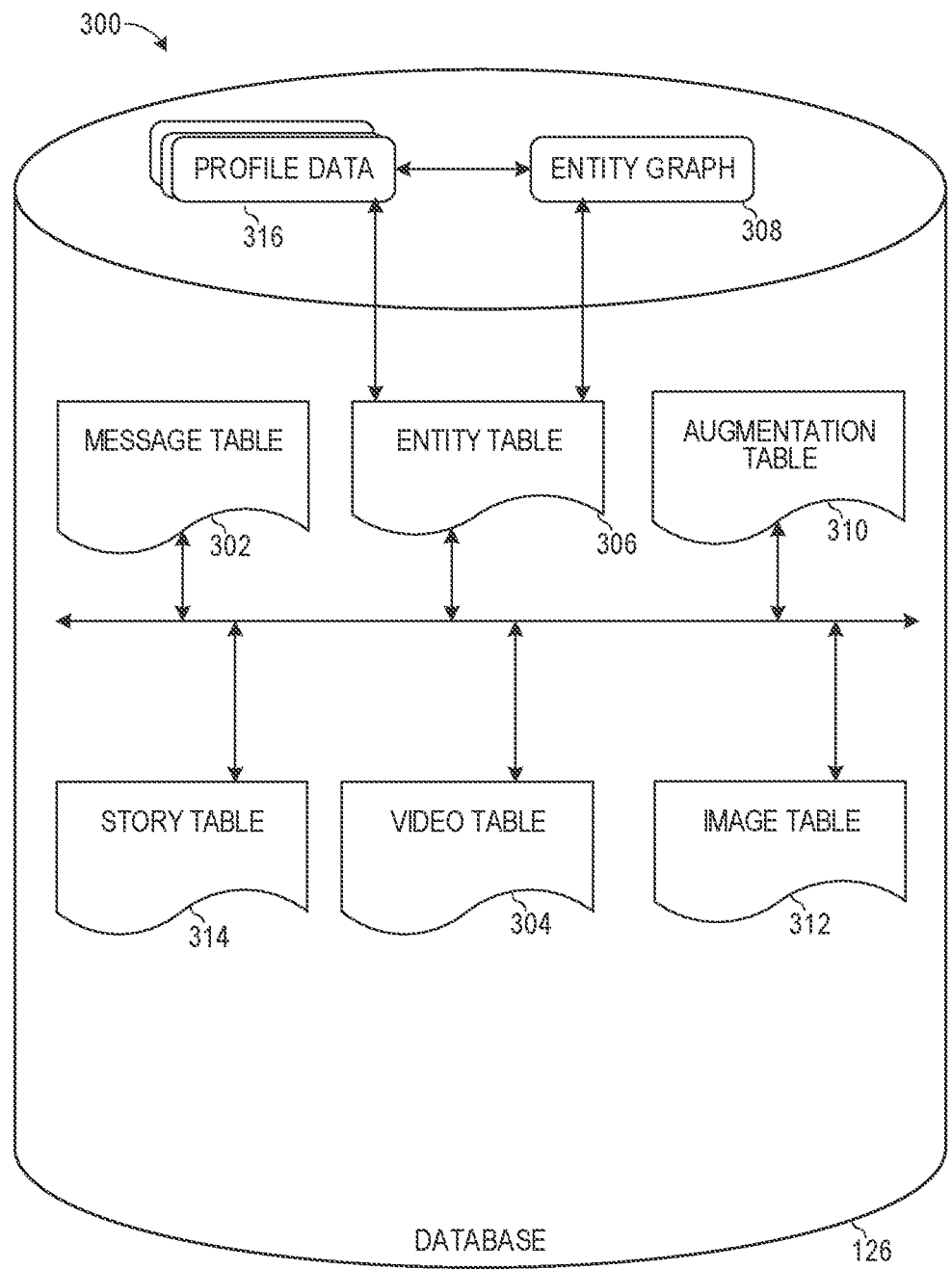
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
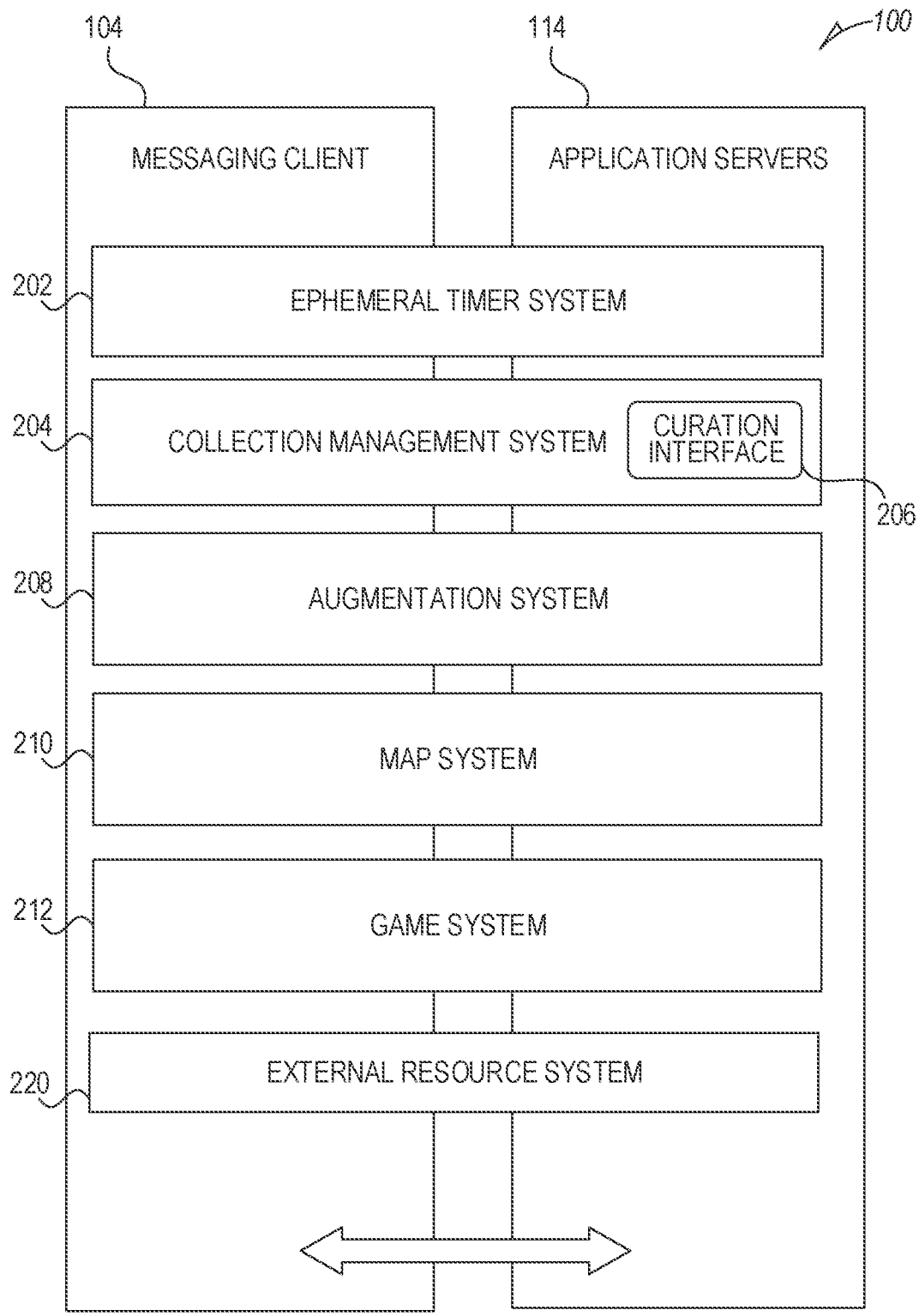
FIG. 2 is a diagrammatic representation of a messaging client application, in accordance with some examples.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the server side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable or grant access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

In an example, the augmentation system 208 is a component that can be accessed by an AR/VR application implemented on the client device 102. The AR/VR application uses an RGB camera to capture a monocular image of a user's real-world face or body wearing a physical item or product. The AR/VR application applies various trained machine learning techniques on the captured image or video of the face and obtains a depth map and to apply one or more visual effects to the captured image to change a look of the physical item on the user. In some implementations, the AR/VR application continuously captures images of the user's face or body wearing the physical item in real time or periodically to continuously or periodically update the applied one or more visual effects (e.g., the augmented reality eyewear, lipstick or hat). This allows the user to move around in the real world and see the one or more visual effects update in real time.

In an example, the augmentation system 208 (and/or a purchase detection system incorporated in or associated with the augmentation system 208) detects purchase of a physical item by a user of the messaging client 104. In response to detecting purchase of the physical item, the augmentation system 208 identifies an augmented reality experience related to the physical item and enables or grants the messaging client 104 associated with the user to have access to the augmented reality experience. For example, the augmentation system 208 detects that the user of the messaging client 104 purchased a physical (tangible) product, such as lipstick, a garment of clothing, eyeglasses, sunglasses, or a toy (e.g., a teddy bear). The augmentation system 208 detects purchase of the physical item in one or more ways. For example, the augmentation system 208 can detect purchase of the physical item by receiving a message from the messaging client 104 indicating that the user performed an e-commerce transaction that purchased the physical item. As another example, the augmentation system 208 can detect purchase of the physical item by analyzing one or more features of the physical item depicted in an image or video captured by the client device 102. As another example, the augmentation system 208 can detect purchase of the physical item by scanning or detecting a barcode or unique graphical element that is attached or associated with the physical item in an image or video captured by the client device 102.

In some cases, the augmentation system 208 detects purchase of the physical item in response to determining that the user performed an electronic-commerce (e-commerce) transaction with the messaging client 104 or some other third-party shopping application. For example, the messaging client 104 can display an icon or option to purchase a physical item. In response to receiving a user selection of the icon or option, the messaging client 104 completes purchase of the physical item causing the physical item to be mailed or made available for pickup by the user of the messaging client 104. The messaging client 104 also sends a communication or message to the augmentation system 208 identifying the physical item that the user has purchased. The augmentation system 208 can store in a database a list of physical items (e.g., identifiers of physical items) and their respective one or more augmented reality experiences. The augmentation system 208 retrieves a physical item identifier of the physical item that the user has purchased in response to receiving the communication from the messaging client 104. In response, the augmentation system 208 searches the physical item identifiers stored in the database for a physical item identifier that matches the physical item identifier received from the messaging client 104 in the communication.

In some cases, the augmentation system 208 detects purchase of the physical item in response to matching one or more features of a physical item depicted in an image to a known set of features that represent the physical item. For example, the messaging client 104 can activate a camera of the client device 102. The camera of the client device 102 can capture a video feed or one or more images of the physical item. For example, the user, after purchasing a given physical product, can point the camera of the client device 102 towards the physical product. In one example, the physical product can be laid down flat on a surface (e.g., a floor or a bed) and the camera of the client device 102 can capture an image or video of the physical product. In another example, the physical product can be worn by the user and the camera of the client device 102 can capture an image or video of the user wearing the physical product. For example, the front facing camera of the client device 102 can capture an image of the user's face wearing eyeglasses, sunglasses, or a hat. As another example, the rear-facing camera (world camera) of the client device 102 can capture an image or video of a reflection of the user in a mirror in which the user wears the physical product, such as a dress, shirt, pants or other garment or article of clothing.

After capturing the image or video of the physical product, the messaging client 104 can apply one or more machine learning techniques to extract one or more features of the physical product. The messaging client 104 can transmit a communication or message to the augmentation system 208 that includes the extracted one or more features of the physical product. The augmentation system 208 can store in a database a list of known or expected physical item features and their respective one or more augmented reality experiences. The augmentation system 208 searches the physical item features stored in the database for a set of physical item features that match the one or more features received in the message or communication from the messaging client 104.

In some cases, the augmentation system 208 detects purchase of the physical item in response to detecting a barcode in an image or video that depicts the physical item. The barcode can include instructions for the messaging client 104 to launch the augmented reality experience, such as on a limited-access basis. For example, the messaging client 104 can activate a camera of the client device 102. The camera of the client device 102 can capture a video feed or one or more images of the physical item. For example, the user, after purchasing a given physical product, can point the camera of the client device 102 towards the physical product. The physical product can have a barcode embedded thereon, attached thereto (e.g., as part of a tag that is removable or non-removable), or associated therewith. In response to detecting the barcode, the client device 102 can decode the barcode to obtain an instruction, unique number associated with the physical item or augmented reality experience, or IP address. The information encoded in the barcode can be used by the client device 102 to communicate with the augmentation system 208 to obtain the one or more augmented reality experiences that are associated with the physical product. In an implementation, in response to detecting the barcode, the client device 102 launches the one or more augmented reality experiences that are associated with the physical product to enable the user to augment or modify the image or video that depicts the image of the physical item.

In an example, in response to identifying a match to a given physical item identifier, an instruction specified in a barcode attached to or associated with the physical item, and/or the set of known physical item features, the augmentation system 208 obtains the one or more augmented reality experiences that are associated with the given physical item identifier, instruction specified in the barcode or the set of known physical item features. For example, the augmentation system 208 obtains identifiers of the one or more augmented reality experiences. The augmentation system 208 grants access to and instructs the messaging client 104 to enable the augmented reality experiences associated with the identifiers, such as by displaying one or more options associated with each of the one or more augmented reality experiences. In some cases, the augmentation system 208 displays the one or more options in response to determining that a camera feed from a camera of the client device 102 is being received, captured and displayed. For example, the client device 102 can capture by a camera of the client device 102 a camera or video feed that depicts the physical item. The augmentation system 208 receives a user selection of one of the options to activate the augmented reality experience associated with the option. This causes the augmentation system 208 to apply one or more augmented reality elements associated with the activated augmented reality experience to the camera or video feed, such as to one or more images that depict the physical item.

In some examples, the augmentation system 208 can enhance security and prevent fraudulent or misappropriated use of a given one of the augmented reality experiences associated with the physical items. To do so, the augmentation system 208 can enable access to or grants access to the augmented reality experience associated with a given physical item on a limited access basis. In one example, the access can be limited by the number of times the augmented reality experience is launched on a given client device 102. In another example, the access can be limited to specified users, IP addresses, user identifiers or phone numbers associated with a given messaging client 104.

For example, a given augmented reality experience of the augmented reality experiences associated with the physical items can be enabled for access or granted access to by a given client device 102 only a specified number of times (e.g., 1 time or 3 times). For example, the given augmented reality experience can be associated with a maximum number of accesses on a per user basis. In such cases, each time an input is received that selects an option to access or launch the given augmented reality experience, a locally or remotely stored counter associated with the user of the client device 102 is incremented. For example, after a particular user of the client device 102 purchases the physical item and is provided with an option to access an augmented reality experience associated with the physical item, the client device 102 can track how many times the augmented reality experience is launched. Specifically, the user can activate a camera feed of the client device 102 and select an option to launch the augmented reality experience associated with the physical product. In response, the client device 102 increments a running counter associated with the augmented reality experience. The counter counts how many times the augmented reality experience has been launched by the client device 102. The client device 102 compares the counter to the specified number of times that the augmented reality experience is enabled for access or granted access. In response to determining that the counter value is less than the specified number of times, the client device 102 obtains the augmented reality elements associated with the augmented reality experience and begins modifying the camera feed to include the obtained augmented reality elements.

In response to determining that the counter value is equal to or more than the specified number of times, the client device 102 prevents access to the augmented reality experience and displays a prompt to the user indicating that the maximum number of allowable uses has been reached. For example, after launching the augmented reality experience a first time and exiting the augmented reality experience, the client device 102 can later capture a second image or video that depicts the physical item. The client device 102 can detect a barcode associated with the augmented reality experience in the second image or video and in response can increment the running counter associated with the augmented reality experience. The client device 102 compares the counter to the specified number of times that the augmented reality experience is enabled for access or granted access to. In response to determining that the counter value is less than the specified number of times, the client device 102 obtains the augmented reality elements associated with the augmented reality experience and begins modifying the camera feed to include the obtained augmented reality elements. In response to determining that the counter value is equal to or more than the specified number of times, the client device 102 prevents access to the augmented reality experience and displays a prompt to the user indicating that the maximum number of allowable uses has been reached.

As another example, a given augmented reality experience of the augmented reality experiences associated with the physical items can be enabled for access (e.g., granted access) by a given client device 102 only to specified users, IP addresses, user identifiers or phone numbers. For example, as part of enabling a given client device 102 to access the augmented reality experience, the augmented reality experience can be associated with users, IP addresses, user identifiers or phone numbers of the client device 102. In some cases, the barcode associated with the augmented reality experience is associated with users, IP addresses, user identifiers or phone numbers of the client device 102. Each time an input is received that selects an option to access or launch the given augmented reality experience, an identifier of the user, IP address or phone number of the client device 102 is obtained and compared with the previously associated users, IP addresses, user identifiers or phone numbers of the given augmented reality experience (e.g., the associated with users, IP addresses, user identifiers or phone numbers of the client device 102 associated with the barcode of the augmented reality experience). In response to determining that the obtained identifier of the user, IP address or phone number of the client device 102 matches the previously associated or one of the associated users, IP addresses, user identifiers or phone numbers of the given augmented reality experience, the client device 102 obtains the augmented reality elements associated with the augmented reality experience and begins modifying the camera feed to include the obtained augmented reality elements. In response to determining that that the obtained identifier of the user, IP address or phone number of the client device 102 fails to match the previously associated or one of the associated users, IP addresses, user identifiers or phone numbers of the given augmented reality experience, the client device 102 prevents access to the augmented reality experience and displays a prompt to the user indicating that the user is not authorized to access the selected augmented reality experience. In this way, even if a second user (who did not purchase the physical item) obtains access to the barcode associated with the augmented reality experience of the physical item, that second user is prevented from accessing the augmented reality experience because the identifier of the second user is not associated with the barcode that enables access to the augmented reality experience.

The augmentation system 208 enables client device 102 to modify or augment images or videos that depict physical items that have been purchased in different ways. In some examples, the augmentation system 208 can allow users to share images or videos (e.g., media items) they create using the augmented reality experiences associated with the physical items with other users. For example, after detecting that a given user purchases a physical product and enabling access to the augmented reality experience associated with the physical product, the augmentation system 208 receives input that selects the augmented reality experience to modify an image or video that depicts the physical product. After modifying the image or video, the augmentation system 208 can receive input from the user to share the image or video with other users of the messaging client 104. The messaging server 118 can receive the image or video can add the modified image or video to a gallery view of media items that displays a plurality of media items that are uploaded by and shared by other users of the messaging server 114.

The messaging server 118 routinely and periodically changes the display order of the media items displayed in the gallery view. For example, the messaging server 118 can rank the media items by popularity among other attributes (e.g., number of views, age of the content, duration, quality, and so forth) and display the media items in the gallery view based on the ranks. In some cases, the media items ranked higher than other media items are presented earlier or in a larger size than the other media items. One of the attributes considered by the messaging server 118 in ranking the media items can include the type of augmented reality experience used to modify the content depicted in the media item received from a given messaging client 104. For example, the messaging server 118 can determine that a media item is received from a given messaging client 104 which has been modified or augmented using an augmented reality experience that is associated with a physical item. In such cases, the messaging server 118 can increase a rank of such a media item to cause the media item to be ranked higher than or relative to other media items that have been modified by other augmented reality experiences that are not associated with physical items. In some cases, the messaging server 118 can place media items which have been modified or augmented using various augmented reality experiences that are each associated with a same or different physical item in a dedicated portion of the gallery view. This portion includes exclusively media items that have been modified by a particular augmented reality experience related to a corresponding physical item. This enables other users of the messaging server 118 to easily and quickly access content or media items which have been modified by augmented reality experiences associated with physical items. This can increase the popularity and interest in the brand associated with physical items and can thereby promote the brand associated with the physical items.

In some examples, the augmentation system 208 can be used to improve a fit or recommended physical items or garments to a user. Specifically, the augmentation system 208 can allow the user to access a virtual try-on augmented reality experience prior to detecting purchase of the physical product or item. In this experience, an image or video of the user or user's environment is captured by the client device 102 and an augmented reality version of a physical product is displayed on the user or within the user's environment. This allows the user to envision how the physical item will appear in real life before actually purchasing the physical item. The augmentation system 208 can record a video or image of the augmented reality version of a physical product that is displayed on the user or within the user's environment. This recorded image or video can be stored as a virtual try-on image or video in response to detecting a purchase transaction by the user which purchases the physical item corresponding to the augmented reality version of the physical product. The augmentation system 208 stores real-world physical measurements of the physical product in association with the recorded image or video.

After detecting purchase of the physical item (as discussed above), the augmentation system 208 can capture an image of the user wearing the physical item or an image or video that depicts the physical item within the user's environment. The augmentation system 208 retrieves the previously captured virtual try-on image or video that depicted the augmented reality version of the physical item on the user or in the user's environment. The augmentation system 208 compares the virtual try-on image with the image of the user wearing the physical item to compute a fit on the user or a fit within the user's environment. The augmentation system 208 computes a target physical measurement by adjusting the one or more physical measurements of the physical item stored in association with the virtual try-on image or video based on the computed fit on the user. For example, the augmentation system 208 can determine that the actual physical item when worn by the user appears larger than the augmented reality version of the item that is worn by the user. In such cases, the augmentation system 208 determines that the measurements of the physical item are too large in comparison to the display size of the augmented reality version of the physical item. In such cases, the augmentation system 208 reduces the size of the physical measurements for this type of physical item in recommending future physical items of this type to the user in the future. For example, if the physical item is a shirt of a medium size, the augmentation system 208 can recommend shirts in the future for the user to purchase that are small in size. Similarly, the augmentation system 208 can determine that the actual physical item when worn by the user appears smaller than the augmented reality version of the item that is worn by the user. In such cases, the augmentation system 208 determines that the measurements of the physical item are too small in comparison to the display size of the augmented reality version of the physical item. In such cases, the augmentation system 208 increases the size of the physical measurements for this type of physical item in recommending future physical items of this type to the user in the future. For example, if the physical item is a shirt of a medium size, the augmentation system 208 can recommend shirts in the future for the user to purchase that are large in size.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
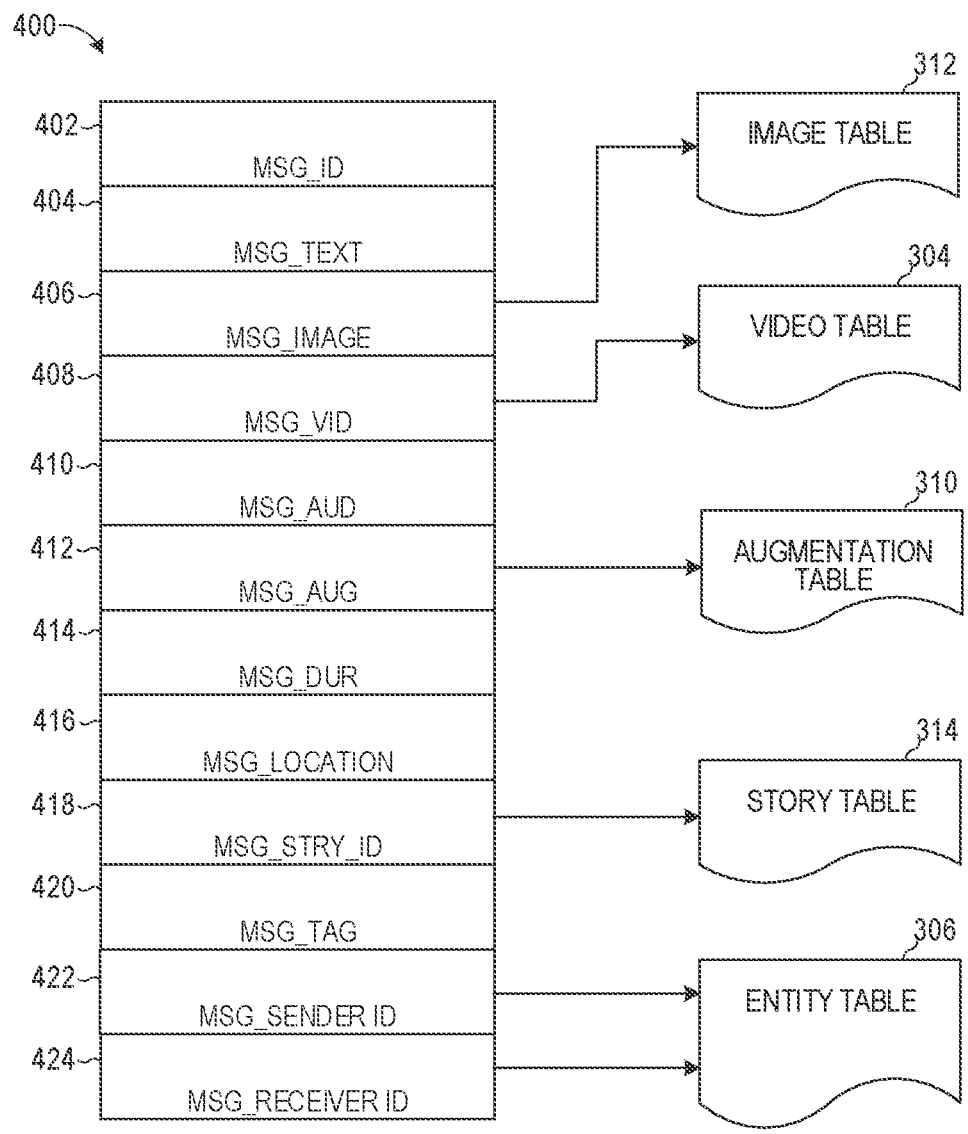
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
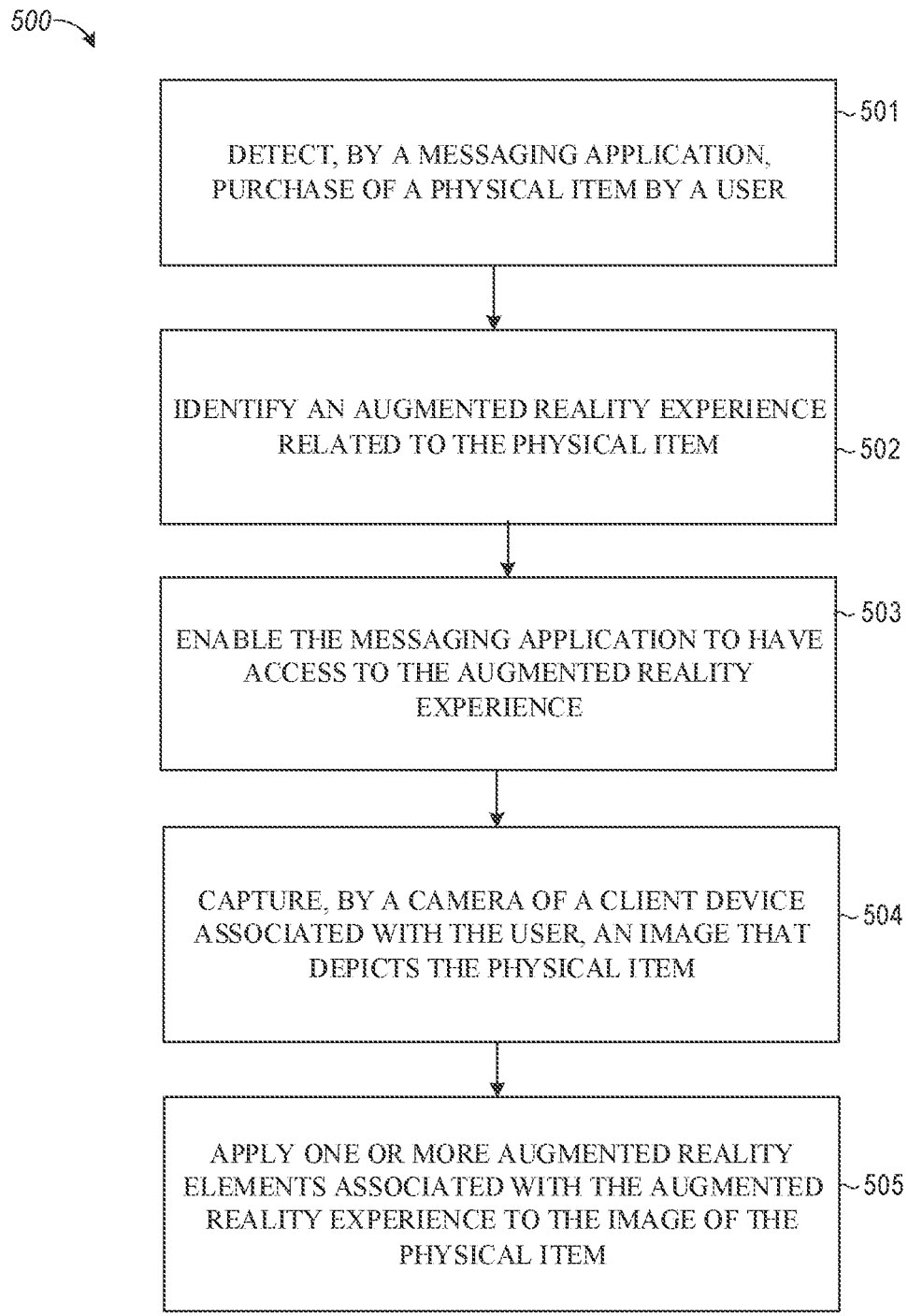
FIG. 5 is a flowchart illustrating example operations of the messaging application server, according to examples.

FIG. 5 is a flowchart of a process 500, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 501, a client device 102 detects, by a messaging application, purchase of a physical item by a user. For example, the augmentation system 208 detects that the user of the messaging client 104 purchased a physical (tangible) product, such as lipstick, a garment of clothing, eyeglasses, sunglasses, or a toy (e.g., a teddy bear). The augmentation system 208 detects purchase of the physical item in one or more ways. For example, the augmentation system 208 can detect purchase of the physical item by receiving a message from the messaging client 104 indicating that the user performed an e-commerce transaction that purchased the physical item. As another example, the augmentation system 208 can detect purchase of the physical item by analyzing one or more features of the physical item depicted in an image or video captured by the client device 102. As another example, the augmentation system 208 can detect purchase of the physical item by scanning or detecting a barcode or unique graphical element that is attached or associated with the physical item in an image or video captured by the client device 102.

At operation 502, the client device 102 identifies an augmented reality experience related to the physical item. For example, the augmentation system 208 obtains a physical item identifier, barcode and/or features of the physical item depicted in an image. In response to identifying a match to a given physical item identifier, an instruction specified in a barcode attached to or associated with the physical item, and/or the set of known physical item features, the augmentation system 208 obtains the one or more augmented reality experiences that are associated with the given physical item identifier, instruction specified in the barcode or the set of known physical item features.

At operation 503, the client device 102 in response to detecting purchase of the physical item, enables the messaging application to have access to the augmented reality experience. For example, the augmentation system 208 instructs the messaging client 104 to enable the augmented reality experiences associated with the identifiers, such as by displaying one or more options associated with each of the one or more augmented reality experiences. In some cases, the augmentation system 208 displays the one or more options in response to determining that a camera feed from a camera of the client device 102 is being received, captured and displayed.

At operation 504, the client device 102 captures, by a camera of a client device associated with the user, an image that depicts the physical item. For example, the user, after purchasing a given physical product, can point the camera of the client device 102 towards the physical product. In one example, the physical product can be laid down flat on a surface (e.g., a floor or a bed) and the camera of the client device 102 can capture an image or video of the physical product. In another example, the physical product can be worn by the user and the camera of the client device 102 can capture an image or video of the user wearing the physical product. For example, the front facing camera of the client device 102 can capture an image of the user's face wearing eyeglasses, sunglasses, or a hat. As another example, the rear-facing camera (world camera) of the client device 102 can capture an image or video of a reflection of the user in a mirror in which the user wears the physical product, such as a dress, shirt, pants or other garment or article of clothing.

At operation 505, the client device 102 applies one or more augmented reality elements associated with the augmented reality experience to the image of the physical item. For example, the augmentation system 208 can replace a background of the image that depicts the physical item with another image or video, add one or more graphical elements around or adjacent to a logo or brand identifier depicted in the image, change a color of a portion or entirety of the physical item, add one or more graphical elements on or around a portion of a user's body or face depicted in the image, replace the physical item with an augmented reality version of the physical item, or any combination thereof.

Figure 6A:
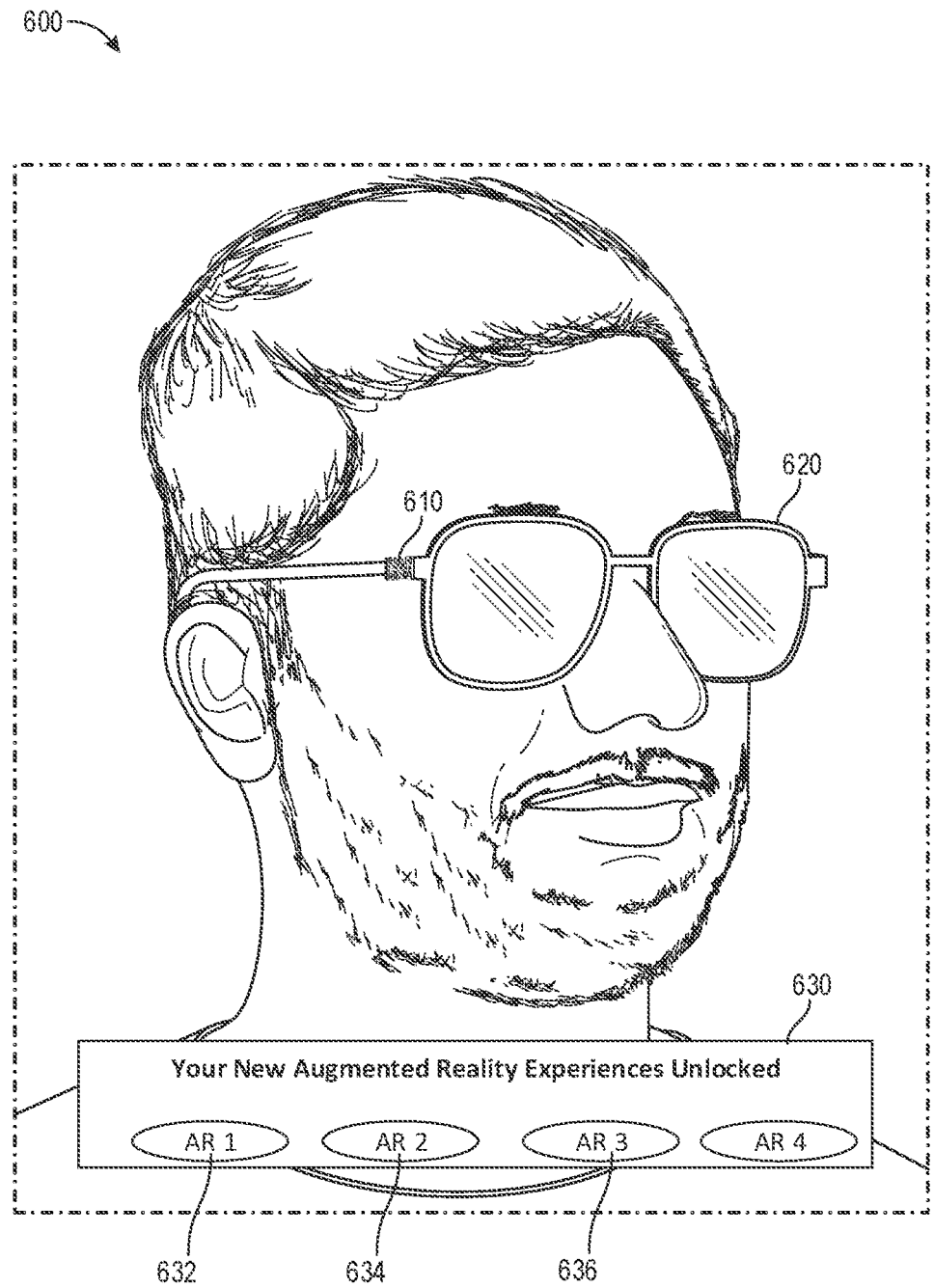
FIGS. 6A, 6B, 7A, 7B, and 8-10 are diagrammatic representations of outputs of the messaging client application, in accordance with some examples.

FIGS. 6A, 6B, 7A, 7B, and 8-10 are diagrammatic representations of outputs of the messaging client application, in accordance with some examples. As shown in FIG. 6A, a messaging client 104 is used by a client device 102 to capture an image or video 600 of a user's face. The image or video 600 can depict a physical product 620 being worn by the user. The messaging client 104 can use object recognition techniques to identify and segment out the portion of the image or video 600 that depicts the physical product 620. Then, the messaging client 104 can analyze the physical product 620 portion of the image to detect a barcode 610. In response to detecting the barcode 610, the messaging client 104 can decode the barcode 610 to obtain a unique identifier or instructions for activating an augmented reality experience associated with the barcode 610. In an implementation, upon decoding the barcode 610, the messaging client 104 determines that the user depicted in the image has purchased the physical product 620. The messaging client 104 transmits a message or communication to the augmentation system 208 with information decoded from the barcode 610. The augmentation system 208 identifies one or more augmented reality experiences associated with the barcode. The augmentation system 208 also stores an identifier of the user of the messaging client 104 in association with the barcode or identified one or more augmented reality experiences. This limits who is authorized to access the one or more augmented reality experiences.

The augmentation system 208 returns to the messaging client 104 the identified one or more augmented reality experiences. The messaging client 104 displays a prompt or overlay 630 with indicators 632, 634, and 636 of different augmented reality experiences that are associated with the barcode 610 (the physical product 620). Each of the indicators 632, 634, and 636 can cause a different augmented reality experience to be launched upon receiving input that selects a given one of the indicators 632, 634, and 636. In some cases, each of the indicators 632, 634, and 636 is associated with different access restrictions. For example, the indicator 632 is associated with a first augmented reality experience that is access limited by a specified number of access times. Namely, the first augmented reality experience associated with the indicator 632 can only be launched by the user of the messaging client 104 a specified maximum number of times (e.g., 1 time or 3 times). As another example, the indicator 634 is associated with a second augmented reality experience that is access limited to a specified user identifier or phone number. Namely, the second augmented reality experience associated with the indicator 634 can only be launched by users of the messaging client 104 that have a certain user identifier or phone number. As another example, the indicator 636 is associated with a third augmented reality experience that is non-access limited and is available to access by anyone who scans a product having the barcode 610.

Figure 6B:
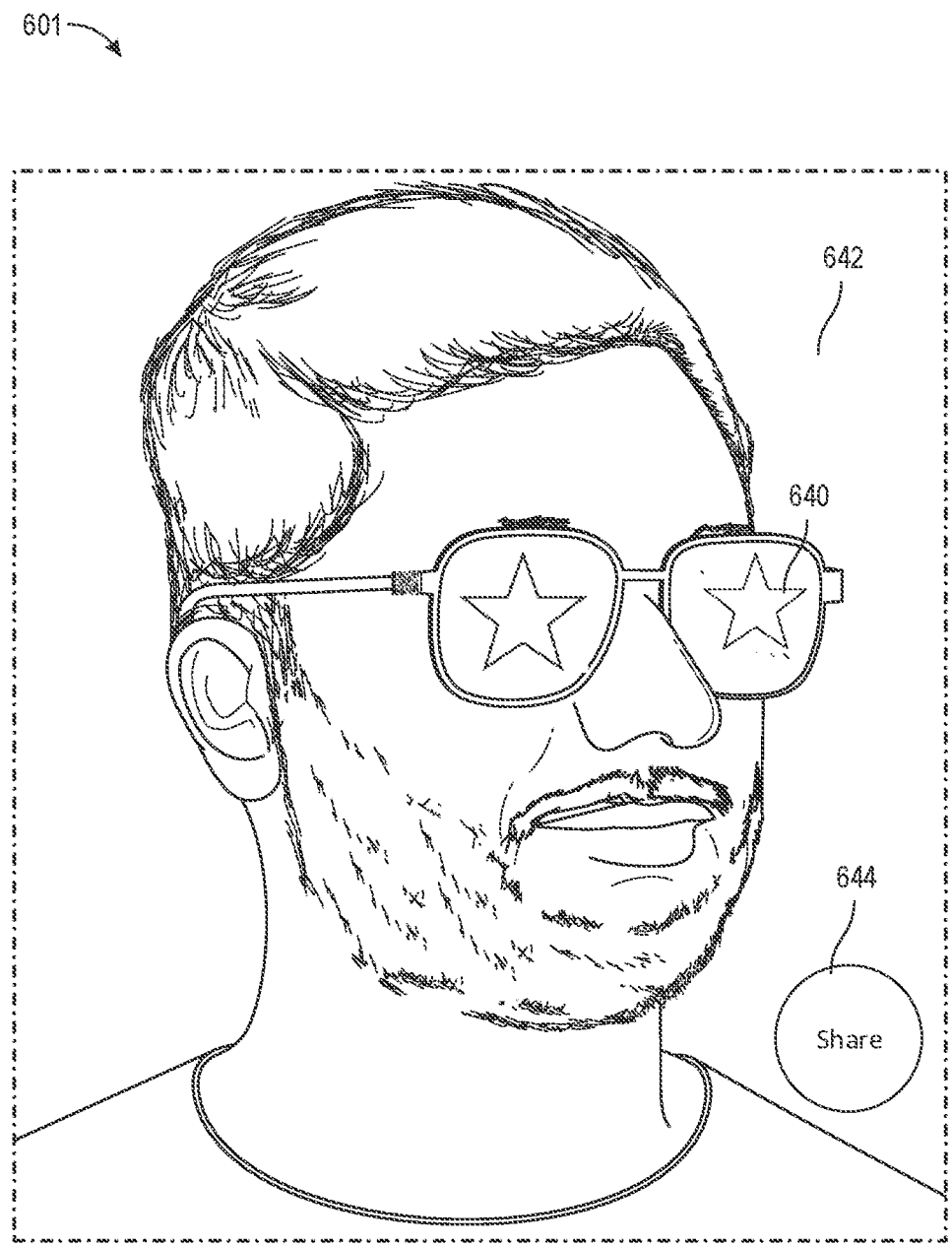

In one example, the messaging client 104 receives input that selects the indicator 632 associated with the first augmented reality experience. In response, the messaging client 104 launches the first augmented reality experience. Specifically, as shown in FIG. 6B, the messaging client 104 presents a screen 601 in which one or more augmented reality elements 640 are displayed. In an example, first augmented reality experience causes the messaging client 104 to display a graphical element(s) 640 (e.g., text or star shapes) within lenses of glasses depicted in the image or video that depicts the physical item purchased by the user. In another example, the first augmented reality experience causes the messaging client 104 to display the graphical element(s) 640 in response to detecting movement of the glasses depicted in the image or video. For example, in response to determining that the glasses are raised above relative to the eyes or lowered to hide the eyes, the messaging client 104 replaces the eyes that are revealed in the image or video with the graphical element(s) 640. Namely, the messaging client 104 can determine that the glasses are raised in the image or video high enough to reveal the pupils of the user who is depicted in the image or video. In response, the messaging client 104 displays star shapes or other animated graphical elements over the pupils that are revealed, such as enlarged cartoon versions of the eyes. In another example, the first augmented reality experience causes the messaging client 104 to change a background 642 in response to detecting movement of the glasses depicted in the image or video. For example, in response to determining that the glasses are raised above relative to the eyes and then lowered again to hide the eyes, the messaging client 104 replaces the background 642 with a different image or video. This results in a modified image or video that depicts the physical item purchased by the user.

The messaging client 104 displays a share option 644 in the screen 601. In response to receiving input that selects the share option 644, the messaging client 104 transmits the modified image or video to a remote server (e.g., the messaging server 118) to be shared with one or more other users of the messaging server 118 on respective messaging clients 104. In one example, the messaging server 118 adds the modified image or video to a gallery view that is accessible to users of the messaging server 118.

Figure 7A:
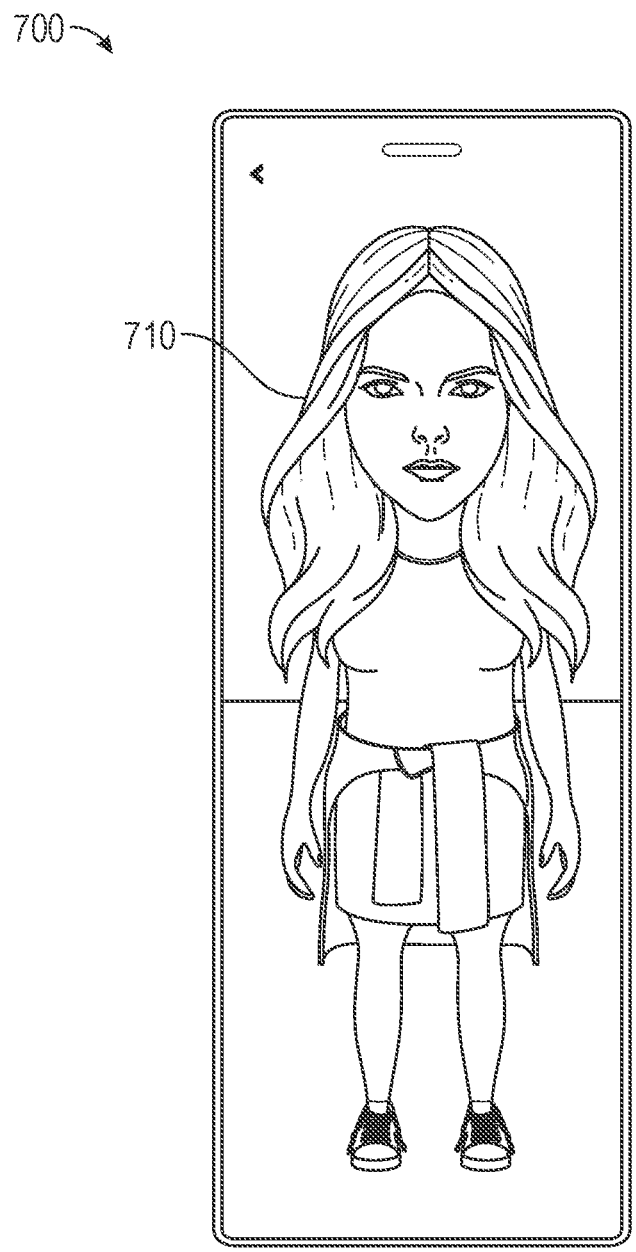

In one example, the messaging client 104 receives input that selects the indicator 634 associated with the second augmented reality experience. In response, the messaging client 104 launches the second augmented reality experience. Specifically, as shown in FIG. 7A, the messaging client 104 presents a screen 700 in which an avatar 710 is displayed. In some examples, the avatar 710 is a representation of the user of the messaging client 104 wearing the physical item (e.g., the physical product 620). The avatar 710 can move around as the user moves around the camera feed and can be shared with other users. The messaging client 104 can receive input from the user that changes the visual attributes of the augmented reality version of the physical product or item being worn by the avatar 710. For example, the color or size of the augmented reality version of the physical product or item can be changed to a different color and size. As another example, the outfit being worn by the avatar can change or be configured to match the physical item that is purchased or possessed by the user.

Figure 7B:
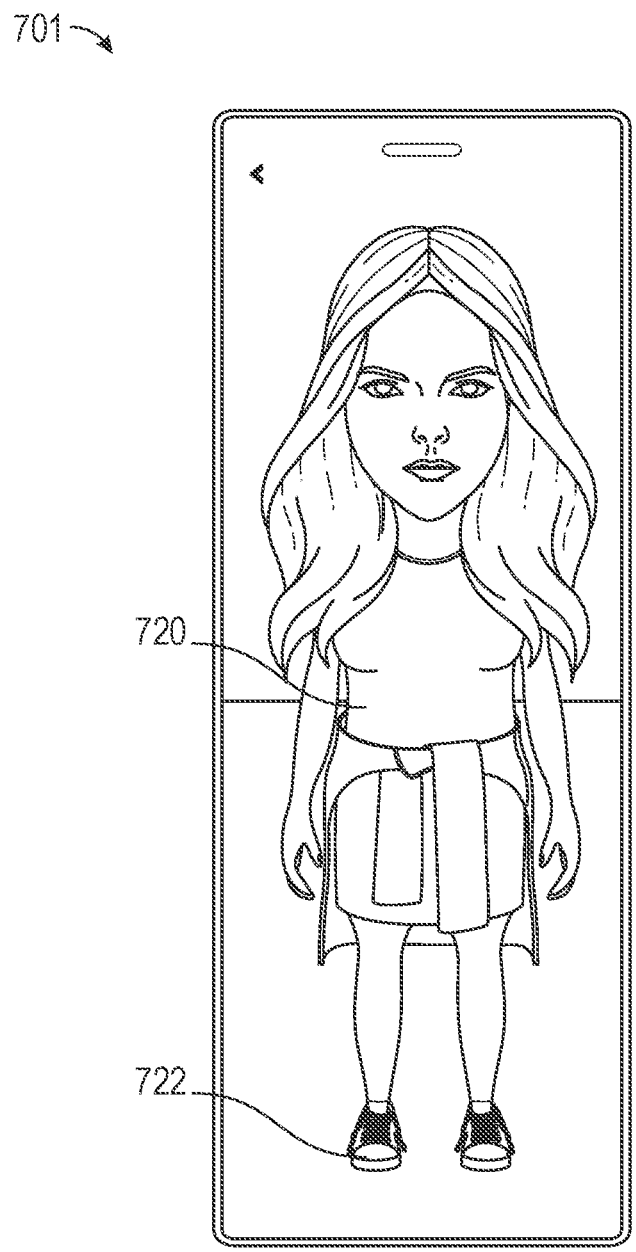

In some examples, the physical item purchased by the user is a garment, such as a shirt. As shown in FIG. 7B, the messaging client 104 can detect an image or video of the user wearing the garment 720 which has been purchased as the physical item. The messaging client 104 can present a screen 701 in which a recommended matching garment 722 can be displayed. For example, the augmented reality experience associated with the garment 720 worn by the user can include another garment that matches the garment 720. This provides a recommendation that considers both the physical and virtual worlds. Specifically, the user may purchase a dress (garment 720 and the augmented reality experience can cause one or more augmented reality graphics that include matching shoes (garment 722) (shoes that match the dress). In such cases, in response to detecting that a physical item being worn by the user in an image or video, the messaging client 104 retrieves the augmented reality elements that cause the matching garment to be displayed. The messaging client 104 can position the augmented reality elements within the image or video based on the type of the augmented reality elements. For example, if the augmented reality elements include augmented reality shoes that match the physical item depicted in the image or video, the messaging client 104 identifies feet of the user in the image or video and positions the augmented reality shoes over the feet in the video.

Figure 8:
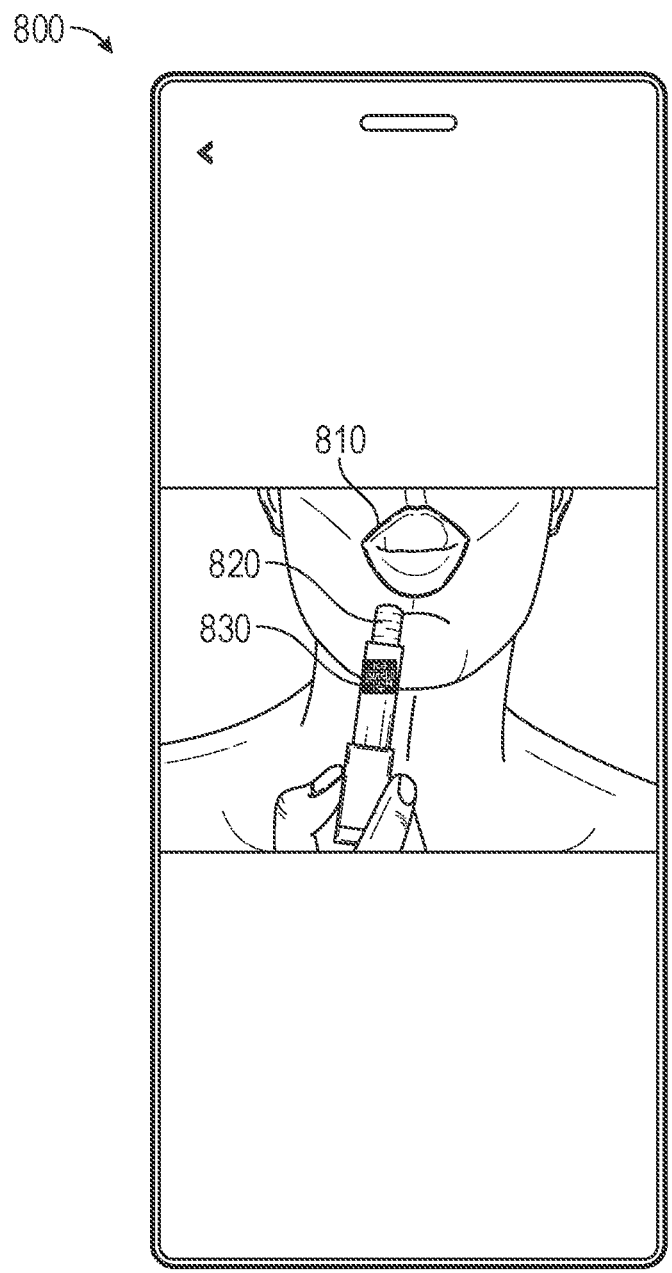

In some examples, the messaging client 104 detects a physical item purchased by a user that includes lipstick 820 in an image or video 800 (FIG. 8). Specifically, the messaging client 104 can determine that a barcode 830 encodes an identifier of a lipstick 820. The messaging client 104 accesses an augmented reality experience associated with the barcode 830 and launches the augmented reality experience. In some cases, rather than accessing the augmented reality experience associated with the lipstick 820 by decoding the barcode 830, the messaging client 104 can extract one or more features of the lipstick 820 to identify the augmented reality experience associated with the one or more features of the lipstick 820. In response to activating the augmented reality experience, the messaging client 104 augments or modifies the image or video 800 using one or more augmented reality elements corresponding to the lipstick 820. For example, the messaging client 104 can receive input that requests to draw on top of the image or video 800. In response, the messaging client 104 activates a paintbrush having a color that corresponds to the color of the lipstick 820, as specified by the augmented reality experience associated with the lipstick 820. The user can draw or paint over any portion of the image or video 800 using the activated paintbrush.

In another example, the messaging client 104 can identify a feature of a face depicted in the image or video 800 that is associated with the physical item purchased by the user. For example, as shown in FIG. 8, in response to determining that the physical item includes lipstick, the messaging client 104 can search the image or video to identify lips of the user's face depicted in the image. The messaging client 104 can perform one or more object recognition techniques to identify the lips. Upon identifying the lips, the messaging client 104 can measure a distance between a tip of the lipstick 820 in the image or video and a portion of the lips of the user's face. In response to determining that the distance is greater than a threshold, the messaging client 104 does not display any augmented reality elements. As the lipstick 820 is brought into closer proximity to the lips in the image or video 800 (e.g., as the distance becomes smaller over subsequent frames in the video 800), the messaging client 104 can determine that the distance matches the threshold. For example, upon the tip of the lipstick 820 touching a portion of the lips, the messaging client 104 displays an augmented reality element 810 over the entire lips portion of the user's face. The augmented reality element 810 can have a color that matches the color of the lipstick 820.

Figure 9:
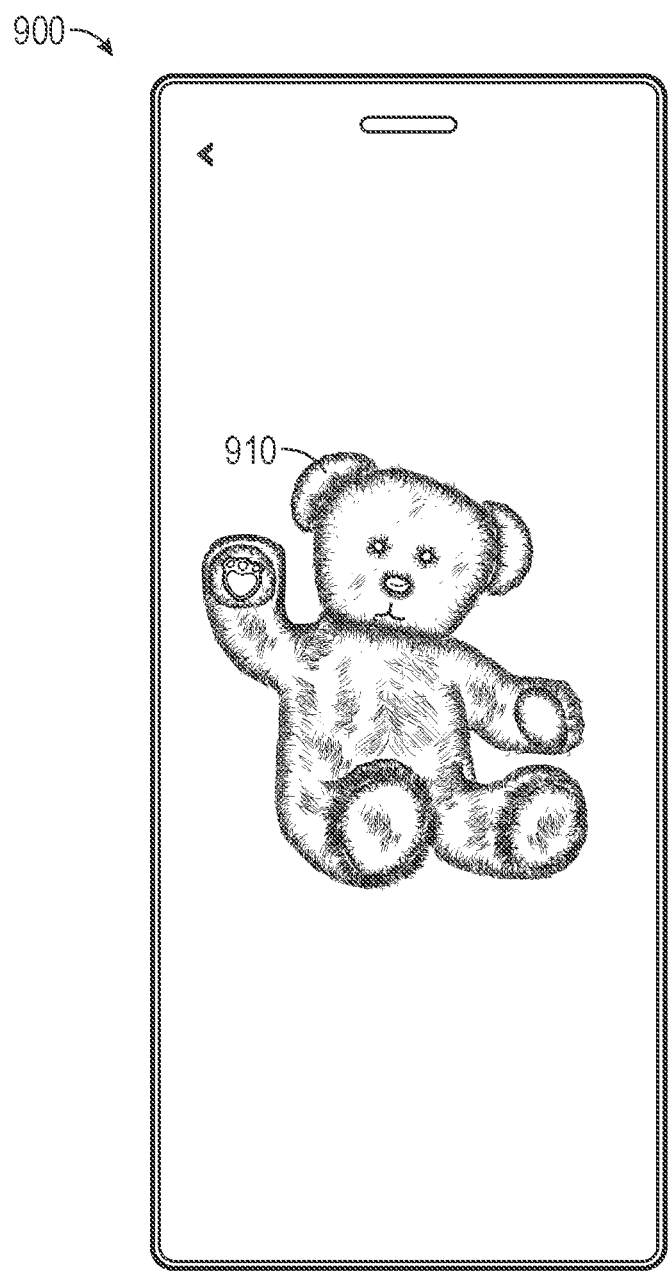

In some examples, the messaging client 104 detects a physical item purchased by a user that includes doll or toy in an image or video 900. For example, as shown in FIG. 9, in response to determining that the physical item includes a doll or toy, the messaging client 104. Specifically, the messaging client 104 can determine that a barcode encodes an identifier of a doll or toy. The messaging client 104 accesses an augmented reality experience associated with the barcode and launches the augmented reality experience. In some cases, rather than accessing the augmented reality experience associated with the doll or toy by decoding the barcode, the messaging client 104 can extract one or more features of the doll or toy depicted in the image or video 900 to identify the augmented reality experience associated with the one or more features of the doll or toy. In response to activating the augmented reality experience, the messaging client 104 augments or modifies the image or video 900 using one or more augmented reality elements corresponding to the doll or toy. For example, the messaging client 104 can replace the doll or toy depicted in the image or video 900 with an augmented reality doll or toy 910. The augmented reality doll or toy 910 can have the same look as the physical doll or toy that is in the image or video 900. The augmented reality doll or toy 910 can be animated to move around and the user can interact with the augmented reality doll or toy 910 by touching it and talking to it. This makes the inanimate doll or toy purchased by the user become animated in augmented reality.

Figure 10:
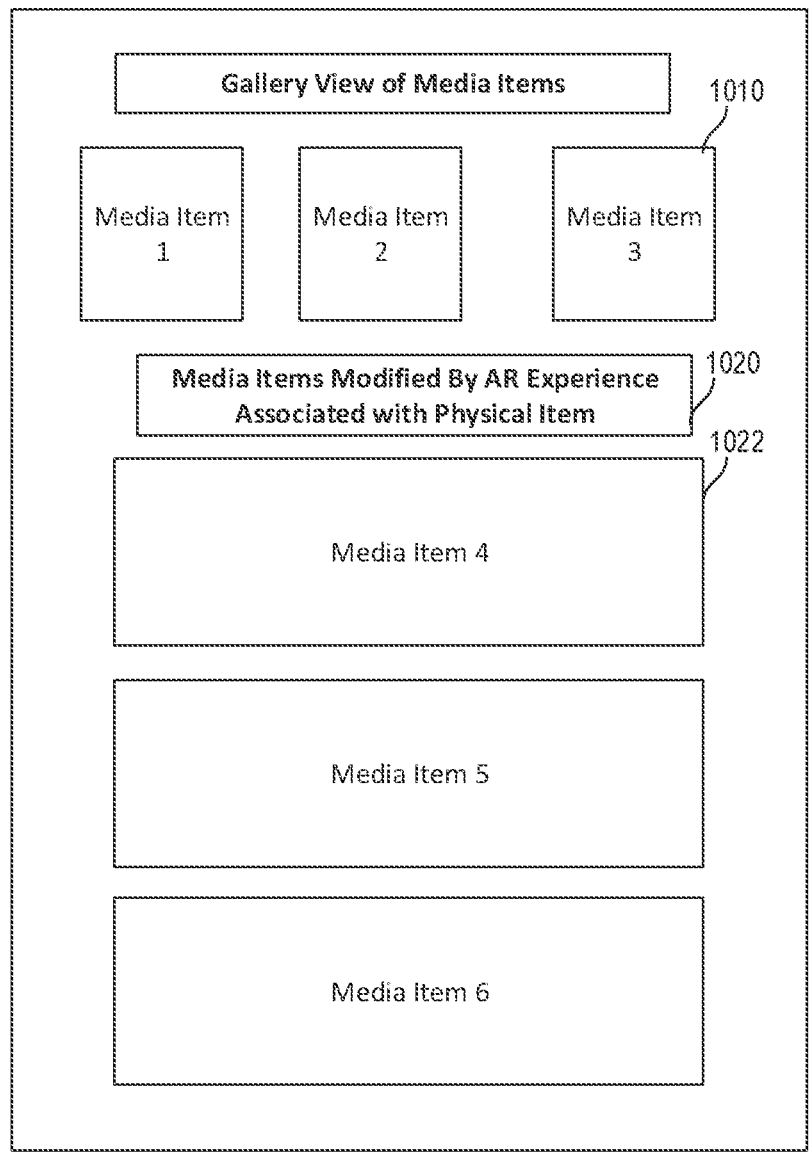

FIG. 10 shows a gallery view 1000 of media items received from users of the messaging server 118. The media items in the gallery view 1000 are ranked based on various attributes, as discussed above. For example, a first media item is ranked higher than a second media item and is displayed earlier in the list of media items 1010. The gallery view 1000 can include a dedicated portion 1020 for displaying media items that have been modified based on augmented reality experiences associated with physical items purchased by users. The dedicated portion 1020 displays the media items 1022 in a different format from the list of media items 1010 that have not been modified by augmented reality experiences associated with physical items purchased by users.

Machine Architecture

Figure 11:
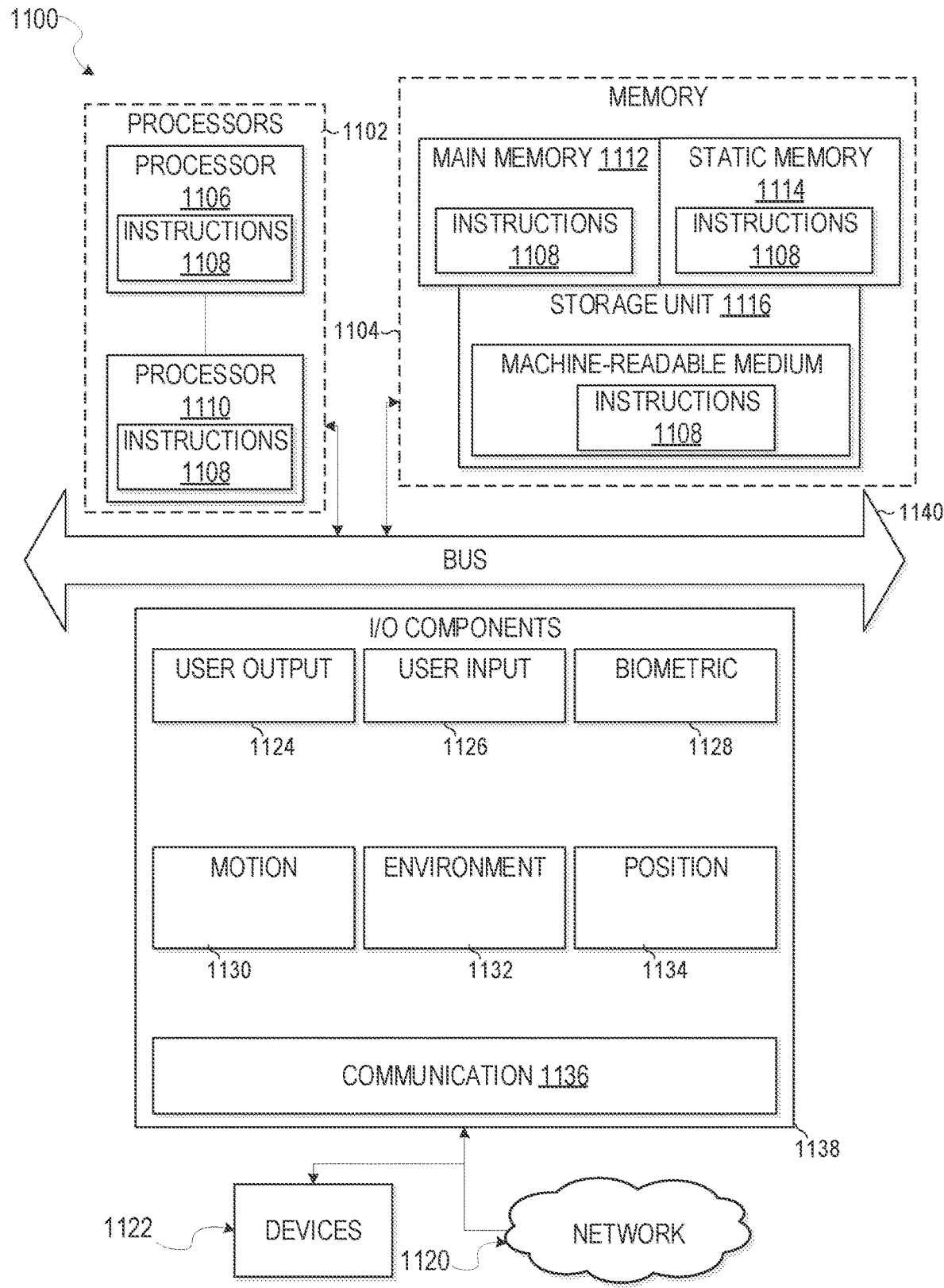
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
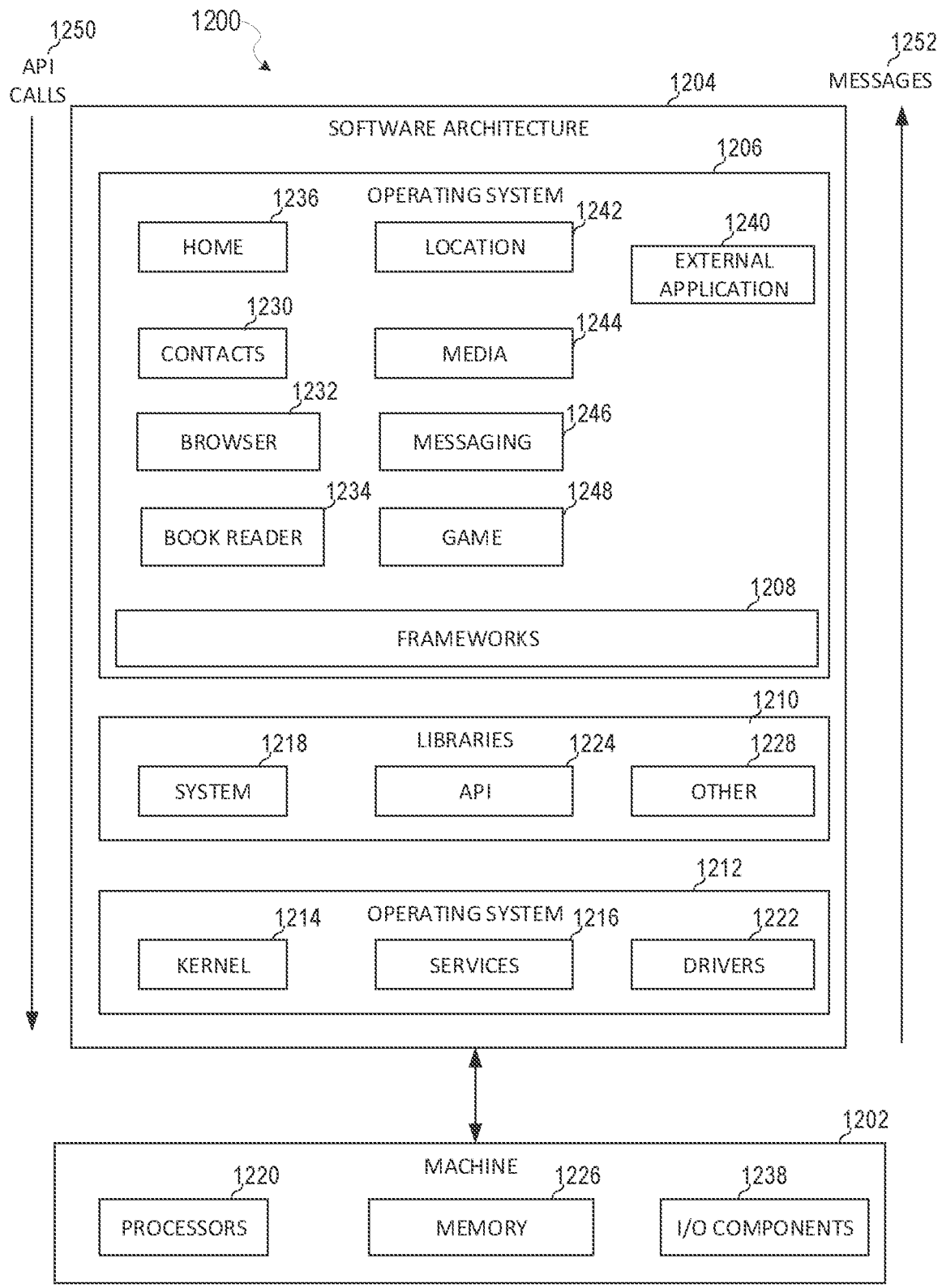
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
   detecting, by an application, completion of purchase of a physical item by a user;
   identifying an augmented reality experience related to the physical item; and
   in response to detecting completion of the purchase of the physical item, granting the application with access to the augmented reality experience.

2. The method of claim 1, further comprising:
   applying one or more augmented reality elements associated with the augmented reality experience to an image that depicts the physical item.

3. The method of claim 1, wherein the physical item comprises a tangible item, and wherein the augmented reality experience is launched on a limited-access basis.

4. The method of claim 1, wherein detecting purchase of the physical item comprises:
   matching one or more features of the physical item depicted in an image to a known set of features that represent the physical item.

5. The method of claim 1, further comprising:
   detecting a barcode that comprises instructions for the application to launch the augmented reality experience on a limited-access basis.

6. The method of claim 5, wherein the augmented reality experience is enabled for access by a client device only a specified number of times, and further comprising:
   launching the augmented reality experience in response to detecting the barcode in an image; and
   incrementing a counter that counts how many times the augmented reality experience has been launched by the client device.

7. The method of claim 6, further comprising:
   after exiting the augmented reality experience, detecting the barcode in a second image captured by the client device;
   incrementing the counter in response to detecting the barcode in the second image;
   comparing the counter to the specified number of times; and
   launching the augmented reality experience again in response to determining that the counter is less than the specified number of times.

8. The method of claim 5, wherein the augmented reality experience is enabled for access only for the user of the application, and further comprising:
   obtaining a user identifier of the user of the application;
   associating the user identifier with the barcode; and
   launching the augmented reality experience in response to determining that the user identifier of the user of the application matches the user identifier with the barcode to prevent other users from launching the augmented reality experience using the barcode.

9. The method of claim 1, further comprising:
   generating a modified image that includes one or more augmented reality elements of the augmented reality experience applied to an image of the physical item;
   transmitting the modified image to a plurality of users of the application; and
   causing the modified image to be included in a gallery view of the application that includes a plurality of media items received from a subset of the plurality of users of the application, wherein the gallery view ranks the plurality of media items based on one or more attributes.

10. The method of claim 9, further comprising:
    determining that the modified image includes one or more augmented reality elements associated with the augmented reality experience related to the physical item; and
    increasing a rank of the modified image relative to the plurality of media items in the gallery view in response to determining that the modified image includes one or more augmented reality elements associated with the augmented reality experience related to the physical item.

11. The method of claim 1, further comprising:
    detecting that the physical item comprises lipstick that is within a threshold distance to lips of a person depicted in an image; and
    in response to detecting that the physical item is within the threshold distance to the lips of the person, applying an augmented reality color to the lips of the person corresponding to the color of the lipstick.

12. The method of claim 1, further comprising comparing a virtual try-on image, that depicts a person wearing an augmented reality version of the physical item, to an image of the person wearing the physical item to compute a fit on the person.

13. The method of claim 1, further comprising:
    prior to detecting purchase of the physical item, launching a virtual try-on augmented reality experience in which a virtual try-on image of the user wearing an augmented reality version of the physical item is captured;
    obtaining one or more physical measurements of the physical item;
    after detecting purchase of the physical item, capturing an image of the user wearing the physical item;
    comparing the virtual try-on image with the image of the user wearing the physical item to compute a fit on the user;
    computing a target physical measurement by adjusting the one or more physical measurements of the physical item based on a computed fit on the user; and
    identifying a second physical item to recommend to the user to purchase or virtually try on based on the target physical measurement.

14. The method of claim 1, further comprising:
    generating a modified image based on the augmented reality experience;
    transmitting the modified image to a plurality of users of the application; and
    causing the modified image to be included in a gallery view of the application that includes a plurality of media items ranked based on one or more attributes.

15. The method of claim 1, wherein the physical item comprises glasses, wherein one or more augmented reality elements are applied to an image causing augmented reality text to be displayed on lenses of the glasses depicted in the image, and wherein the image is a frame of a video depicting the physical item, and further comprising:
- detecting that the glasses have been raised or lowered relative to eyes of a person depicted in the image;
- in response to detecting that the glasses have been raised or lowered relative to the eyes of the person, causing one or more additional augmented reality elements to be displayed over the eyes or around the frame of the glasses; and
- changing a background of the video in response to detecting that the glasses have been raised or lowered relative to the eyes of the person.

16. The method of claim 1, wherein the physical item comprises lipstick, wherein one or more augmented reality elements are applied by receiving input that draws on an image in a color associated with the lipstick, further comprising:
- detecting that the physical item is within a threshold distance to lips of a person depicted in the image; and
- in response to detecting that the physical item is within the threshold distance to the lips of the person, applying an augmented reality color to the lips of the person corresponding to the color of the lipstick.

17. The method of claim 1, further comprising:
detecting a brand logo on the physical item; and
applying one or more augmented reality elements of the augmented reality experience in relation to the brand logo.

18. The method of claim 1, wherein the physical item comprises a doll, further comprising:
- replacing a doll depicted in an image with one or more augmented reality elements of the augmented reality experience, the one or more augmented reality elements representing an augmented reality version of the doll that is animated; and
- enabling the user to interact with the augmented reality version of the doll.

19. A system comprising:
at least one processor; and
a memory component having instructions stored thereon, when executed by the at least one processor, causes the at least one processor to perform operations comprising:
- detecting, by an application, completion of purchase of a physical item by a user;
- identifying an augmented reality experience related to the physical item; and
- in response to detecting completion of the purchase of the physical item, granting the application with access to the augmented reality experience.

20. A non-transitory computer-readable storage medium having stored thereon, instructions when executed by at least one processor, causes the at least one processor to perform operations comprising:
- detecting, by an application, completion of purchase of a physical item by a user;
- identifying an augmented reality experience related to the physical item; and
- in response to detecting completion of the purchase of the physical item, granting the application with access to the augmented reality experience.

* * * * *